US00RE42359E

(19) United States
(12) Reissued Patent
Mizukoshi

(10) Patent Number: US RE42,359 E
(45) Date of Reissued Patent: May 17, 2011

(54) DYNAMICAL QUANTITY SENSOR

(75) Inventor: Masahito Mizukoshi, Nagoya (JP)

(73) Assignee: Denso Corporation, Kariya (JP)

(21) Appl. No.: 12/381,534

(22) Filed: Mar. 12, 2009

Related U.S. Patent Documents

Reissue of:
(64) Patent No.: 6,470,747
Issued: Oct. 29, 2002
Appl. No.: 09/617,801
Filed: Jul. 17, 2000

U.S. Applications:
(60) Continuation of application No. 09/035,018, filed on Mar. 5, 1998, now Pat. No. 6,128,953, which is a division of application No. 08/578,371, filed on Dec. 26, 1995, now Pat. No. 5,734,105, which is a continuation of application No. 08/135,498, filed on Oct. 13, 1993, now abandoned.

(30) Foreign Application Priority Data

Oct. 13, 1992 (JP) ..... 4-274529
Oct. 13, 1992 (JP) ..... 4-274530

(51) Int. Cl.
*G01P 3/02* (2006.01)

(52) U.S. Cl. ..... 73/504.02

(58) Field of Classification Search ..... 73/504.02, 73/504.04, 504.12, 510, 514.02, 514.18, 73/514.32

See application file for complete search history.

(56) References Cited

U.S. PATENT DOCUMENTS 4,483,194 A 11/1984 Rudolf
4,510,802 A 4/1985 Peters
4,598,585 A 7/1986 Boxenhorn
4,653,326 A 3/1987 Danel et al.
4,699,006 A 10/1987 Boxenhorn
4,711,128 A 12/1987 Boura (Continued)

FOREIGN PATENT DOCUMENTS

GB 2 246 635 A 2/1992

(Continued)

OTHER PUBLICATIONS

R.S. Payne, et al., "Surface Micromachined Accelerometer: A technology update", SAE Technical Paper Series, 910496, Feb. 25, 1991, pp. 127-135.

(Continued)

*Primary Examiner* — Helen C. Kwok
(74) *Attorney, Agent, or Firm* — Harness, Dickey & Pierce, PLC

(57) ABSTRACT

This invention provides a dynamical quantity sensor having a novel structure, wherein first beams 3, 4, 5, 6 are extended from side walls of a recess 2 of a substrate 1, and an intermediate support member 7 is disposed on the first beams 3, 4, 5, 6. Second beams 8, 9, 10, 11 extending in a direction crossing substantially perpendicularly the first beams 3, 4, 5, 6 are disposed on the intermediate support member 7, and a weight 12 is disposed on the second beams 8, 9, 10, 11. Opposing electrodes 17 and 19 and opposing electrodes 18 and 20 are used as electrodes for excitation, and opposing electrodes 13 and 15 and opposing electrodes 14 and 16 are used as electrodes for detecting an angular velocity. The movement of the weight 12 resulting from the application of the angular velocity is detected.

30 Claims, 11 Drawing Sheets

U.S. PATENT DOCUMENTS

| | | | |
|---|---|---|---|
| 4,783,237 | A | 11/1988 | Aine et al. |
| 4,882,933 | A | 11/1989 | Petersen et al. |
| 4,891,984 | A | 1/1990 | Fujii et al. |
| 4,896,268 | A | 1/1990 | MacGugan |
| 5,016,072 | A | 5/1991 | Greiff |
| 5,025,346 | A | 6/1991 | Tang et al. |
| 5,121,180 | A | 6/1992 | Beringhause et al. |
| 5,134,881 | A | 8/1992 | Henrion et al. |
| 5,151,763 | A | 9/1992 | Marek et al. |
| 5,233,213 | A | 8/1993 | Marek |
| 5,249,465 | A | 10/1993 | Bennett et al. |
| 5,313,835 | A | 5/1994 | Dunn |
| 5,331,853 | A | 7/1994 | Hulsing, II |
| 5,337,606 | A | 8/1994 | Bennett et al. |
| 5,349,855 | A | 9/1994 | Bernstein et al. |
| 5,359,893 | A | 11/1994 | Dunn |
| 5,377,544 | A | 1/1995 | Dunn |
| 5,408,877 | A | 4/1995 | Greiff et al. |
| 5,417,111 | A | 5/1995 | Sherman et al. |
| 5,447,067 | A | 9/1995 | Biebl et al. |
| 5,447,068 | A | 9/1995 | Tang |
| 5,488,862 | A | 2/1996 | Neukermans et al. |
| 5,501,893 | A | 3/1996 | Laermer et al. |
| 5,511,419 | A | 4/1996 | Dunn |
| 5,511,420 | A | 4/1996 | Zhao et al. |
| 5,734,105 | A | 3/1998 | Mizukoshi |
| 6,009,751 | A | 1/2000 | Ljung |
| 2004/0206176 | A1 | 10/2004 | Willig et al. |

FOREIGN PATENT DOCUMENTS

| | | |
|---|---|---|
| JP | 59-060210 | 4/1984 |
| JP | 60-073414 | 4/1985 |
| JP | 61-114123 | 5/1986 |
| JP | 61-139719 | 6/1986 |
| JP | 62-093668 | 4/1987 |
| JP | 62-232171 | 10/1987 |
| JP | 63-154915 | 6/1988 |
| JP | 01-97225 | 4/1989 |
| JP | 01-104758 | 4/1989 |
| JP | 02-198315 | 8/1990 |
| JP | 03-051711 | 3/1991 |
| JP | 03-36912 | 4/1991 |
| JP | 03-44613 | 4/1991 |
| JP | 03-74926 | 11/1991 |
| JP | 4-8972 | 1/1992 |
| JP | 04-158226 | 6/1992 |
| JP | 04-169856 | 6/1992 |
| JP | 04-242114 | 8/1992 |
| JP | 04-256864 | 9/1992 |
| JP | 05-312576 | 11/1993 |
| JP | 05-333038 | 12/1993 |
| WO | WO 92/01941 | 2/1992 |
| WO | WO 92/14160 | 8/1992 |

OTHER PUBLICATIONS

Frank Goodenough, "Surface Micromachining Technology", Nikkei Electronics, Nov. 1991, No. 540, pp. 223-231 (with partial translation).

W. Yun, et al. "Fabrication Technologies for Integrated Microdynamic Systems", Presented at the Third Toyota Conference, Aichi-ken, Japan: Oct. 22-25, 1989.

M. Offenberg, et al., "Novel Process for a Monolithic Integrated Accelerometer", Proc Transducers 95, vol. 1, 1995, 148-C4, First Presented at the 8th International Conference on Solid-State Sensors and Actuators, and Eurosensors IX, Stockholm, Sweden, Jun. 25-29, 1995.

L. Paratle, et al., "A Novel Comb-Drive Electrostatic Stepper Motor", Transducers, 1991, International Conference on Solid-State Sensors and Actuators, Digest of Technical Papers (Cat. No. 91CH2817-5), Publication Date: Jun. 24-27, 1991, Meeting Date: Jun. 24, 1991-Jun. 27, 1991.

Frank Goodenough, "Surface Micromachining Technology", Nikkei Electronics, Nov. 1991, No. 540, pp. 223-231 (with partial translation).

W. Yun, et al. "Fabrication Technologies for Integrated Microdynamic Systems", Presented at the Third Toyota Conference, Aichi-ken, Japan: Oct. 22-25, 1989.

M. Offenberg, et al., "Novel Process for a Monolithic Integrated Accelerometer", Proc Transducers 95, vol. 1, 1995, 148-C4, First Presented at the 8th International Conference on Solid-State Sensors and Actuators, and Eurosensors IX, Stockholm, Sweden, Jun. 25-29, 1995.

L. Paratle, et al., "A Novel Comb-Drive Electrostatic Stepper Motor", Transducers, 1991, International Conference on Solid-State Sensors and Actuators, Digest of Technical Papers (Cat. No. 91CH2817-5), Publication Date: Jun. 24-27, 1991, Meeting Date: Jun. 24, 1991-Jun. 27, 1991.

VOUT
1
2
3
4
5
6
7
8
9
10
11

DYNAMICAL QUANTITY SENSOR

Matter enclosed in heavy brackets [ ] appears in the original patent but forms no part of this reissue specification; matter printed in italics indicates the additions made by reissue.

This is a continuation application Ser. No. 09/035,018, filed Mar. 5, 1998 now U.S. Pat. No. 6,128,953 the entire contents of which is hereby incorporated by reference which is a Divisional of application Ser. No. 08/578,371 filed Dec. 26, 1995 now U.S. Pat. No. 5,734,105, which is a File Wrapper Continuation of 08/135,498 filed Oct. 13, 1993 now ABN.

BACKGROUND OF THE INVENTION

1. Field of the Invention

This invention relates to a dynamical quantity sensor for detecting a dynamical quantity such as an angular velocity, acceleration, or the like.

2. Description of the Related Art

A tuning fork type device or a tuning plate type device using a piezoelectric device has been known in the past as a device for detecting a yaw rate by utilizing the Coriolis force.

However, such a device requires machining of a complicated shape and bonding of a piezoelectric device, and is not therefore free from the problems that the reduction of size and cost of production and accomplishment of higher precision are difficult. A yaw rate sensor according to the prior art comprises piezoelectric ceramics, for example, and detects the yaw rate by utilizing the Coriolis force, but has been difficult to reduce size and the cost of production. To solve these problems, the inventors of the present invention have already proposed a yaw rate sensor having the construction which is shown in FIG. 1 of the accompanying drawings. In this construction, a vibrating direction 10 of a weight 1, a rotating direction 11 to be applied to the sensor and a detecting direction 4 of the Coriolis force obtained by such a rotation have a relationship such that they orthogonally cross one another.

On the other hand, the sensor device 1 must be vibrated in the vibrating direction 10 of the weight and the detecting direction 4 of the Coriolis force. Therefore, the sensor device 1 (that is, the weight) is constituted in such a manner that a supporting direction (the direction of the arrangement of a support member 2) coincides with a direction of the axis of rotation 7. In this construction, an electrode 6 for detecting the vibration must be disposed on a plane below the sensor device 1 opposing the first plane 8 of the sensor device. Accordingly, there remain the problems yet to be solved that the construction is complicated and the production is difficult.

It may be conceivable to form the second surface 9 of the sensor device 1 on the upper surface thereof but in such a case, the support member 2 must be disposed at a lower portion. In view of the production of the sensor device by micro-machining, however, it is quite impossible to accomplish the production method of such a sensor device.

SUMMARY OF THE INVENTION

It is therefore an object of the present invention to provide a dynamical quantity sensor having a novel structure which can be easily produced by micro-machining owing to its simple shape, and makes it possible to reduce size and the cost of production, and to accomplish higher precision.

To accomplish the object described above, the present invention provides a dynamical quantity sensor fundamentally comprising a weight, anchor portions, connecting portions for connecting the weight and the anchor portions, and peripheral members encompassing the members described above, wherein the members other than the peripheral members are integrally shaped by the same semiconductor material. The upper main planes of these members are mutually disposed on the same plane, the anchor portions and the peripheral members are fixed to a substrate, and the weight can move in a first direction and in a second direction orthogonally crossing the first direction inside a plane in parallel with the plane described above.

More specifically, the first embodiment of the present invention provides a dynamical quantity sensor wherein a weight is supported by L-shaped beams, a plane defined by these L-shaped beams is used as a moving plane of the weight, and the movement of the weight due to the function of a dynamical quantity is detected.

The second embodiment of the present invention provides a dynamical quantity sensor wherein first beams are extended from anchor portions, a movable intermediate support member is disposed on the first beams, second beams extending in a direction crossing substantially orthogonally the first beams are disposed on the intermediate support member, a weight is disposed on the second beams, and the movement of the weight resulting from a dynamical quantity is detected.

In the present invention, the weight is allowed to move with deformation of the L-shaped beams. The movement of the weight resulting from the action of a dynamical quantity is detected, and the dynamical quantity is detected.

The weight is allowed to move due to deformation of the first beams or the second beams. The movement of the weight with the dynamical quantity is detected, and the dynamical quantity is detected.

DETAILED DESCRIPTION OF THE PREFERRED EMBODIMENTS

Hereinafter, preferred embodiments of dynamical quantity sensors according to the present invention will be explained with reference to the accompanying drawings.

Figure 1:
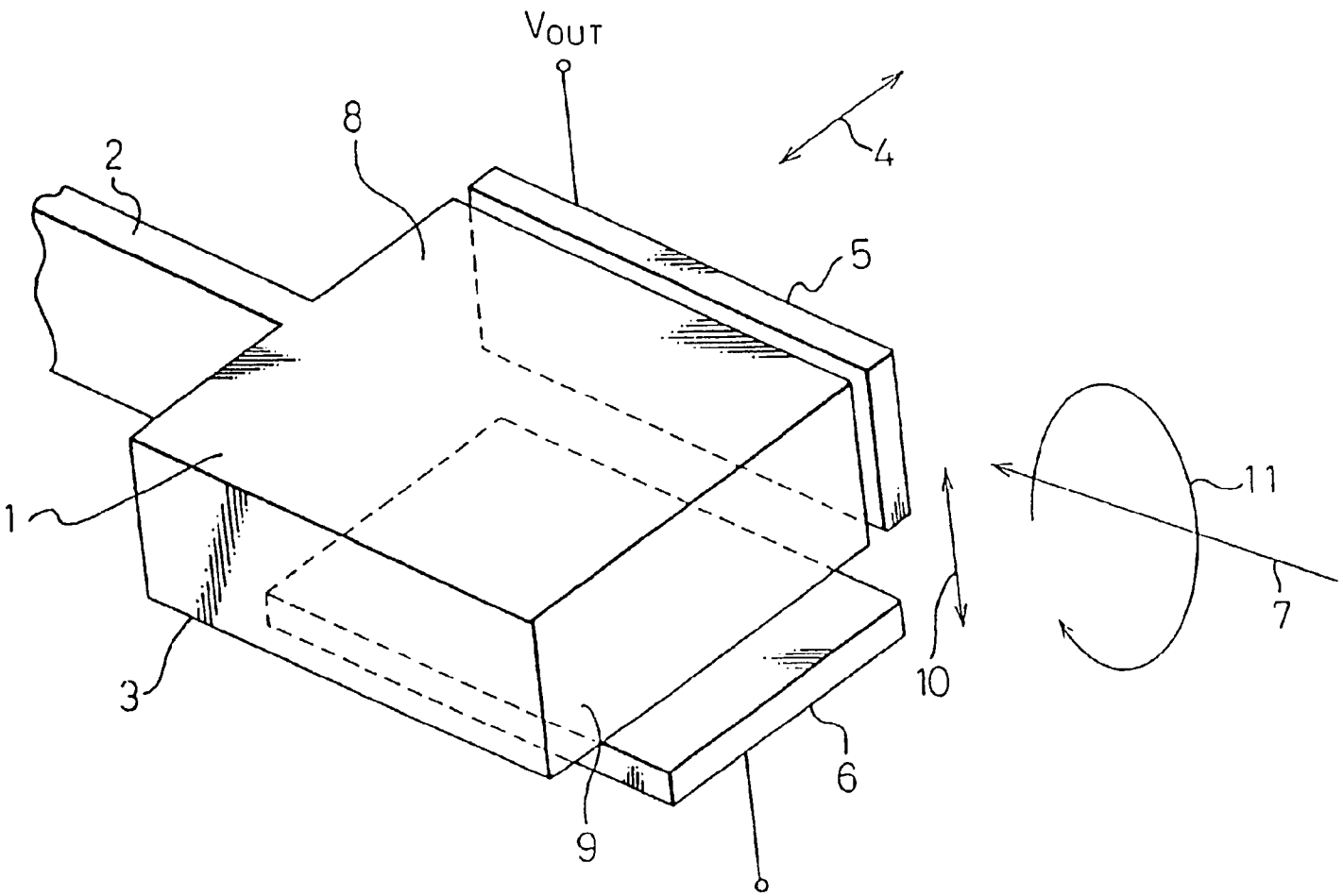
FIG. 1 is an explanatory view useful for explaining the problems with a yaw rate sensor.
Figure 2:
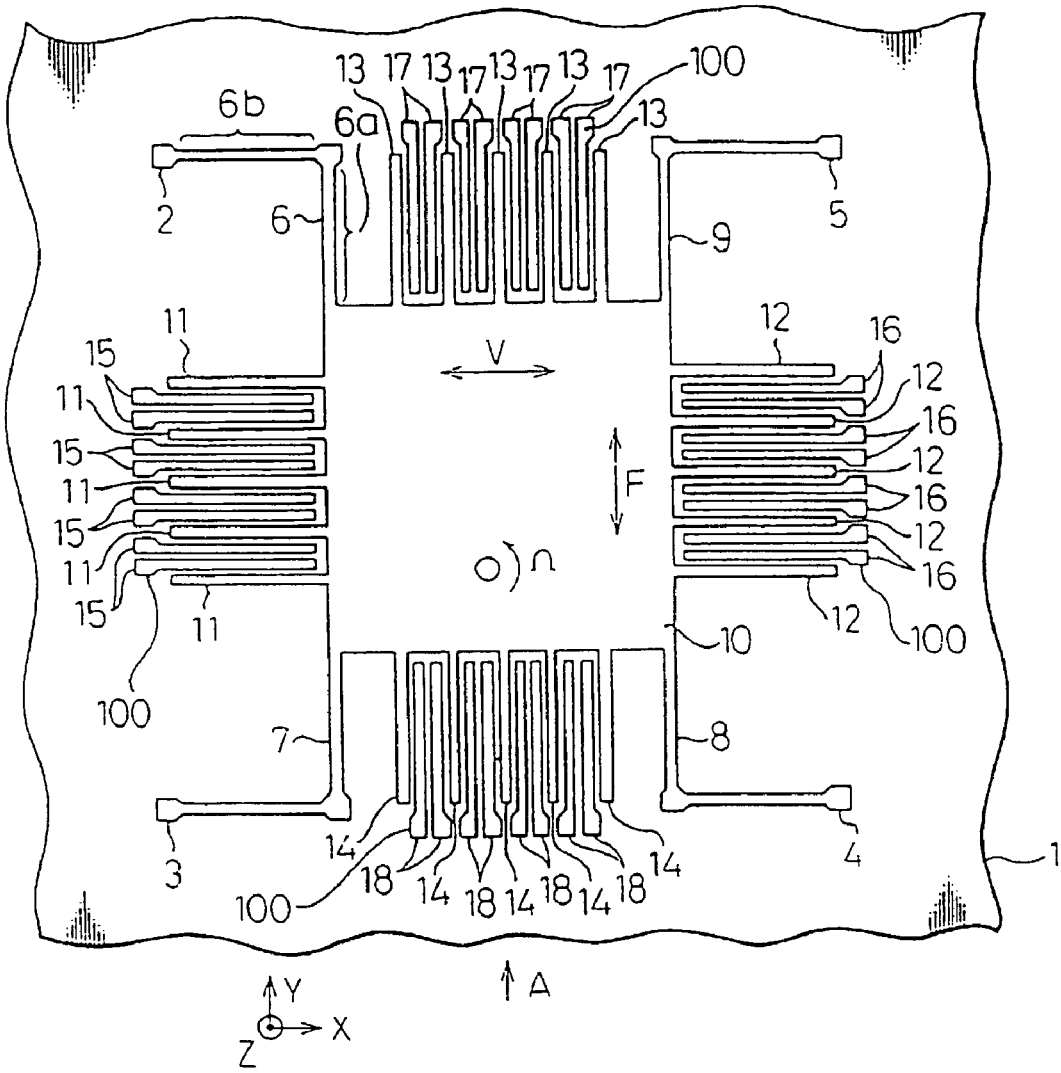
FIG. 2 is a plan view of an angular velocity sensor as one definite embodiment of a dynamical quantity sensor according to the present invention.
Figure 3:
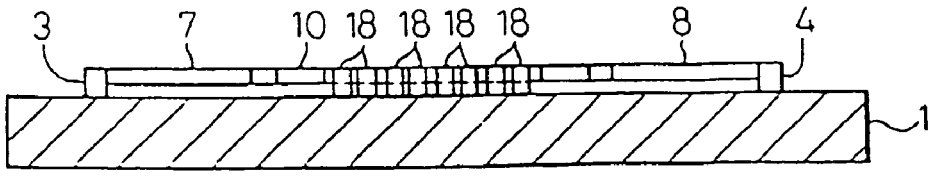
FIG. 3 is a sectional view taken along a line of arrow A in FIG. 2.

FIG. 2 is a plan view of an angular velocity sensor as one definite embodiment of the dynamical quantity sensor according to the present invention, and FIG. 3 is a sectional view taken along an arrow A of FIG. 2. A substrate 1 comprises a single crystal silicon substrate (or ceramic or glass) and has a side of several millimeters and a thickness of about 500 μm.

In other words, FIG. 2 shows a dynamical quantity sensor which comprises a weight 10, anchor portions 2, 3, 4, 5, connecting portions 6 to 9 for connecting the weight 10 to the anchor portions 2 to 5, and peripheral portions 100 encompassing the former members, wherein at least the members other than the peripheral portions 100 are integrally molded from the same semiconductor material, the upper main plane of each of these members is mutually disposed on the same plane, the anchor portions 2 to 5 and the peripheral portions 100 are fixed to the substrate 1, and the weight 10 is so constituted as to be capable of moving in a first direction inside a plane parallel to the plane described above and in a second direction orthogonally crossing the first direction. In this construction, each of the connecting portions 6 to 9 comprises a first beam portion 6a and a second beam portion 6b rectangularly crossing the first beam portion 6a, and electrodes 11 to 14 and 15 to 18 are disposed at least on the planes of the peripheral members 100 opposing the weight 10, respectively.

The construction of the dynamical quantity sensor according to the present invention will be explained in further detail. In FIG. 2, four anchor portions 2, 3, 4, 5 are implanted to the upper surface of the substrate 1, and L-shaped beams 6, 7, 8, 9 are extended from these anchor portions 2 to 5. A square weight 10 having electric conductivity is formed at the other end of each of the L-shaped beams 6 to 9, and the beams 6 to 9 and the weight 10 are disposed in such a manner as to extend on the plane which is parallel to the surface of the substrate 1.

Five rod-like electrodes 11 are so disposed on the left side surface of the weight 10 as to extend in a transverse direction in FIG. 2 (in an X-axis direction). Similarly, five rod-like electrodes 13 are so disposed on the upper side surface of the weight 10 as to extend in a vertical direction in FIG. 2 (in a Y-axis direction). Furthermore, five rod-like electrodes 14 are likewise disposed on the lower side surface of the weight 10 in FIG. 2 in such a manner as to extend in the vertical direction in FIG. 2 (in the Y-axis direction).

A pair of rod-like electrodes 15 are disposed between a pair of electrodes 11, respectively, and one of the ends of each rod-like electrode 15 is fixed to the upper surface of the substrate 1. The electrodes 11 and the electrodes 15 constitute opposed electrodes, respectively. A pair of rod-like electrodes 16 are disposed between a pair of electrodes 12, and one of the ends of each rod-like electrode 16 is fixed to the upper surface of the substrate 1. The electrodes 12 and the electrodes 16 constitute the opposed electrodes, respectively. Similarly, a pair of rod-like electrodes 17 are disposed between a pair of electrodes 13, and one of the ends of each rod-like electrode 17 is fixed to the upper surface of the substrate 1. The electrodes 13 and the electrodes 17 constitute the opposed electrodes, respectively. A pair of rod-like electrodes 18 are disposed between a pair of electrodes 14, and one of the ends of each rod-like electrode 18 is fixed to the upper surface of the substrate 1. The electrodes 14 and the electrodes 18 constitute the opposed electrodes, respectively. The spaces between the fixed electrodes 15 to 18 and the movable electrodes 11 to 14 serve as electrode gaps, respectively.

In other words, in the embodiment of the invention shown in FIG. 2, the groups of electrodes 15 to 18 so disposed as to oppose the peripheral portions of the weight correspond to the peripheral members 100 that encompass the weight. In the same way as the connecting portions 7 and 8 shown in FIG. 3, the groups of the electrodes 15 to 18 may be constituted in such a manner that one of the ends of each of these electrodes is fixed to the substrate with the other being separated from the surface of the substrate 1 so as to form a wedge, or may be constituted in such a manner that all the electrodes are fixed to the substrate 1.

Here, the beams 6 to 9 corresponding to the connecting portions, the weight 10 including the electrodes 11 to 14, and the electrodes 15 to 18, are so arranged as to define a gap (space) of 1 to 2 μm with the upper surface of the substrate 1. In other words, the beams 6 to 9 and the weight 10 are supported by the anchor portions 2 to 5 in a floating state. These anchor portions function as extension terminals of movable electrodes. Moreover, according to the present invention, at least these portions other than the peripheral portions are preferably made of the same semiconductor material and their upper main plane exists on the same plane.

As will be described elsewhere, the anchor portions 2 to 5, the beams 6 to 9, the weight 10 including the electrode 11 to 14, and the electrodes 15 to 18, are formed by a micromachining technique of the surface of the substrate 1 using sacrifice layer etching.

Incidentally, the weight 10 is a rectangular parallelopiped (100 μm square, about 2 μm-thick) and is symmetrical with respect to the X axis (axis of excitation) and the Y axis (vibration axis due to the Coriolis force). Each of the L-shaped beams 6, 7, 8, and 9 has a thickness of about 2 μm, a width of about 1 μm and a length of about 100 μm. If the width is smaller than the thickness, the weight 10 can move more easily in the planar direction of the substrate (in the horizontal direction) but can move with more difficultly in the depth-wise direction (in the vertical direction) of the substrate 1. Further, each of the electrodes 11 to 18 has a thickness of about 2 μm, a width of about 1 μm and a length of about 100 μm.

Next, the production process of the angular velocity sensor will be explained with reference to FIGS. 4 to 8.

Figure 4:
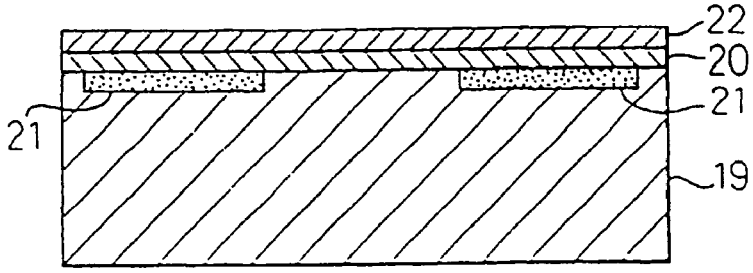
FIGS. 4 to 8 are sectional views, each showing a production step of the angular velocity sensor.

First of all, a silicon nitride (SiN) film 20 is formed on the surface of a single crystal silicon substrate 19 to a thickness of about 1 μm by plasma CVD or thermal CVD as shown in FIG. 4. Diffusion leads 21 for wiring the anchor portions 2 to 5 (the extension terminals of the movable electrodes) and the fixed electrodes 15 to 18 to a signal processing circuit (not shown in the drawings) inside the silicon substrate are then formed by ion implantation or thermal diffusion. A silicon dioxide ($SiO_2$) film 22 as a sacrifice layer is then formed on the surface of the substrate to a thickness of about 1 μm by thermal CVD.

Figure 5:
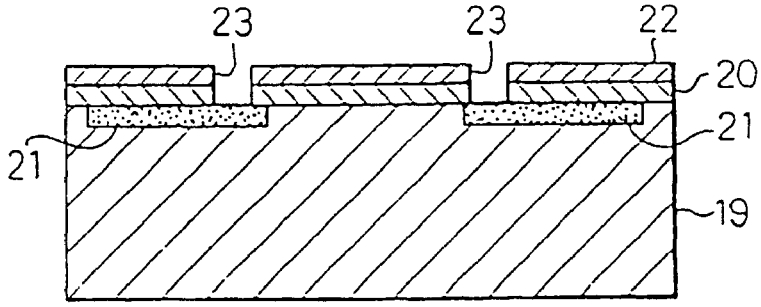

Subsequently, as shown in FIG. 5, openings 23 are formed in the regions of the $SiO_2$ film 22 and the SiN film 20 at those portions which correspond to the fitting portions (root portions) of the anchor portions 2 to 5 and the fixed electrodes 15 to 18, by dry etching according to RIE using a resist as a mask (step of opening contact holes).

Figure 6:
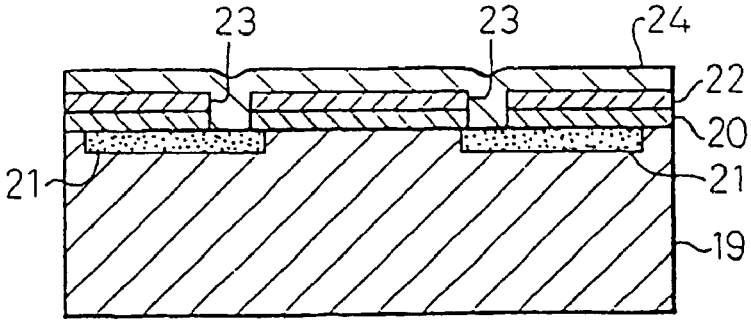

Further, a poly-silicon film 24 is deposited to a thickness of about 2 μm on the $SiO_2$ film 22 inclusive of the inside of the openings 23 by thermal CVD as shown in FIG. 6. Incidentally, amorphous silicon by vacuum deposition may be used in place of this poly-silicon film 24.

Figure 7:
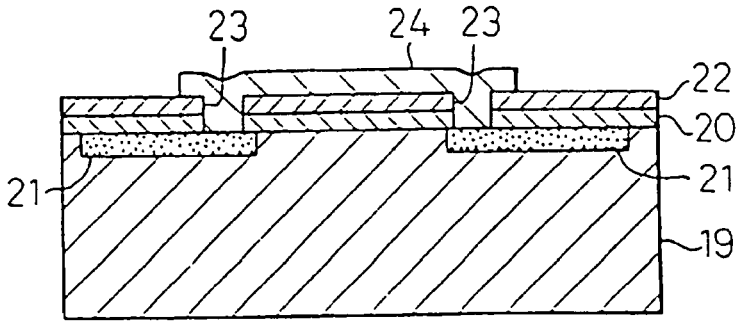

Next, as shown in FIG. 7, the poly-silicon film 24 is etched by drying etching according to RIE using the resist as the mask in such a manner as to define the shapes of the beams 6 to 9, the electrodes 15 to 18, and the weight 10 including the electrodes 11 to 14.

Figure 8:
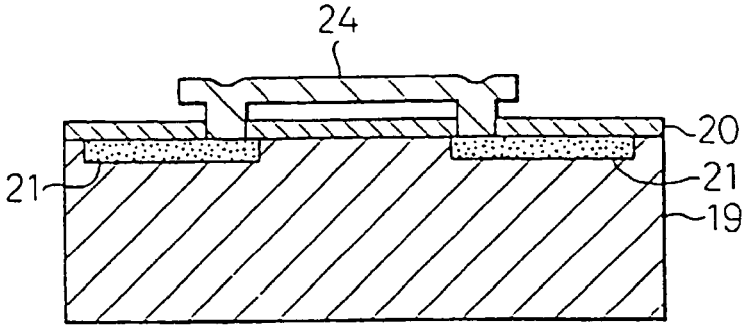

Further, as shown in FIG. 8, the $SiO_2$ film 22 (the sacrifice layer) is etched and removed by dipping into diluted hydrofluoric acid (or buffered hydrofluoric acid) as shown in FIG. 8. At this time, since the etching solution reaches the portion below the weight 10, the weight 10, the beams 6 to 9 and the electrodes 11 to 14 are brought into the state where they are spaced apart from the upper surface of the substrate 19.

The angular velocity sensor thus produced operates in the following way.

The opposed electrodes 13, 17 and 14, 18 are excitation electrodes (capacitors), and when an A.C. voltage is applied to these electrodes, the weight 10 is vibrated (excited) in the X-axis direction due to the electrostatic attraction. At this time, since the linear portions of the L-shaped beams 6 to 9, which are in parallel with the Y axis (the portion 6a in the case of the beam 6 shown in FIG. 2) undergo deflection, the weight 10 vibrates in the X-axis direction.

The opposed electrodes 11, 15 and 12, 16 are electrodes (capacitors) for detecting the Coriolis force. When an angular velocity Ω occurs round the axis orthogonally crossing the sheet of the drawing in FIG. 2 (Z-axis), the weight 10 receives a Coriolis force of $Fc=2\ mv\Omega$ in the Y-axis direction. Here, symbol m represents the mass of the weight 10 and v represents the speed of the weight 10. This Coriolis force has the same cycle as that of the excitation impressed voltage and the weight 10 vibrates in the Y-axis direction, too, in the same cycle as that in the X-axis direction. At this time, the linear portions of the L-shaped beams 6 to 9 (the portion 6b of the beam 6 shown in FIG. 2) which are in parallel with the X axis undergo deflection and consequently, the weight 10 vibrates in the Y-axis direction.

In this way, the weight 10 undergoes displacement in the Y-axis direction due to the Coriolis force, and this displacement (vibration) is detected as the capacitance change by the opposed electrodes 11, 15 and 12, 16. The rotary angular velocity Ω is detected on the basis of this capacitance change. In other words, since the amplitude in the Y-axis direction is proportional to the Coriolis force $2\ mv\Omega$ and since m and v are known, the rotary angular velocity Ω can be determined from the amplitude in the Y-axis direction.

As described above, this embodiment employs the construction wherein the weight 10 is supported by the L-shaped beams 6 to 9, the plane defined by the L-shaped beams 6 to 9 is used as the movable plane of the weight 10 and the motion of the weight 10 resulting from the application of the rotary angular velocity Ω is detected. In this way, this embodiment provides an angular velocity sensor having a novel structure having a beam structure which has a weight capable of two-dimensional displacement in the planar state which can be subjected to micro-machining.

Figure 9:
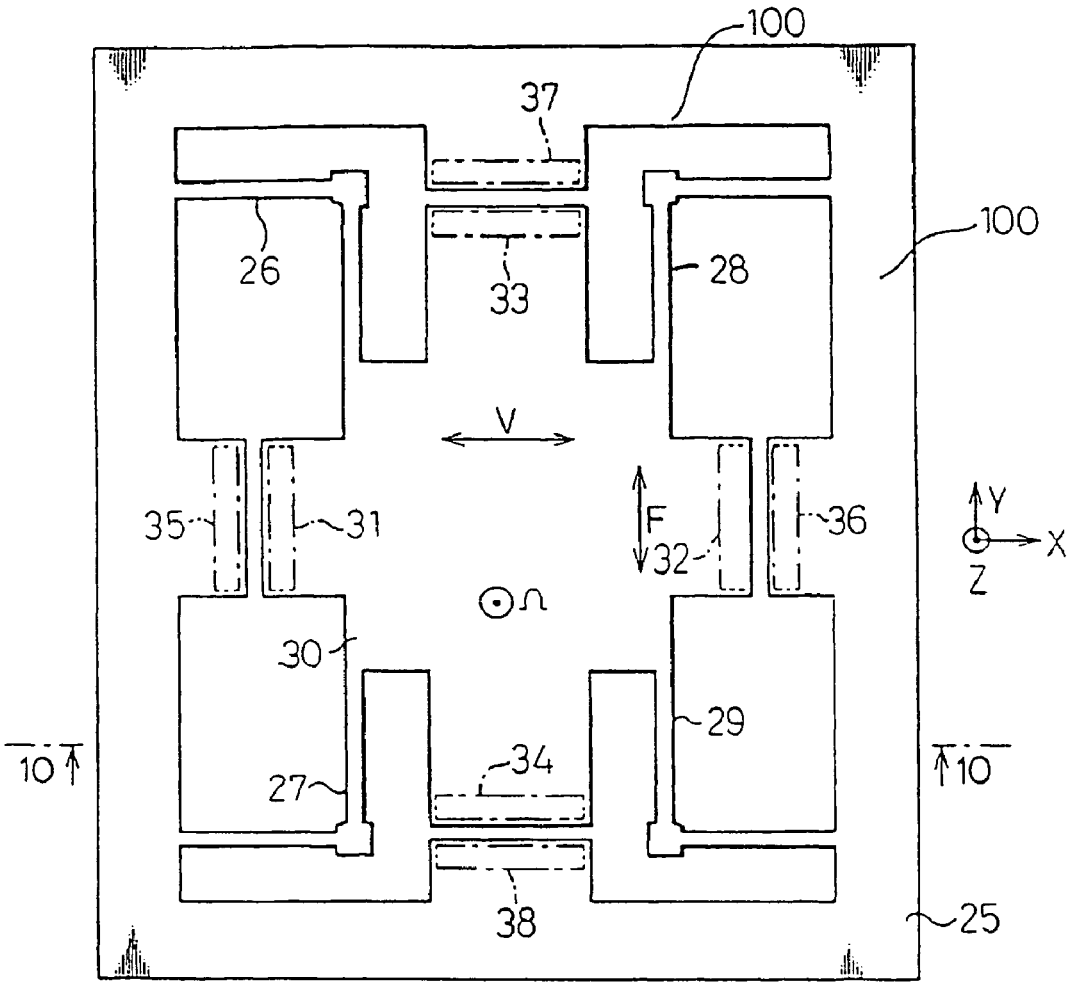
FIG. 9 is a plan view of an angular velocity sensor as another definite embodiment of the dynamical quantity sensor according to the present invention.
Figure 10:
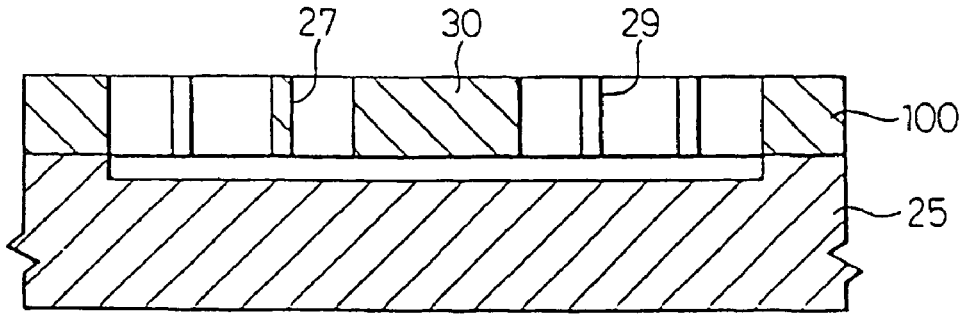
FIG. 10 is a sectional view taken along a line B—B of FIG. 9.

However, the present invention is not particularly limited to the embodiment described above. For example, though the opposed electrodes (capacitors) have the comb-tooth shape so as to reduce the area in the embodiment described above, the electrode area can also be reduced in the depth-wise direction of the substrate 1, as shown in FIGS. 9 and 10.

Namely, four beams 26 to 29 corresponding to the L-shaped connecting portions are extended on the substrate 25, and the weight 30 is supported by the other end of each of these beams 26 to 29. Electrodes 31 to 34 on the side of the weight 30 and electrodes 35 to 38 on the fixed electrode side are formed in the X- and Y-axis directions orthogonally crossing each other on the surface of the substrate 25.

In this embodiment, the peripheral members 100 are formed with a predetermined height, and substantially encompass the weight 30. The electrodes 35 to 38 opposing the electrodes 31 to 34, which are disposed around the weight 30, are disposed on the opposed surface on the side of the peripheral members 100 which oppose the weight 30 in the proximity of the latter.

Figure 11:
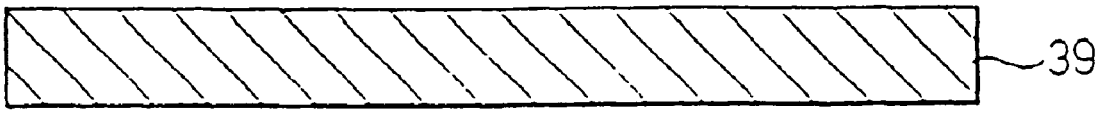
FIGS. 11 to 13 are sectional views, each showing a production step of the angular velocity sensor shown in FIGS. 9 and 10.
Figure 12:
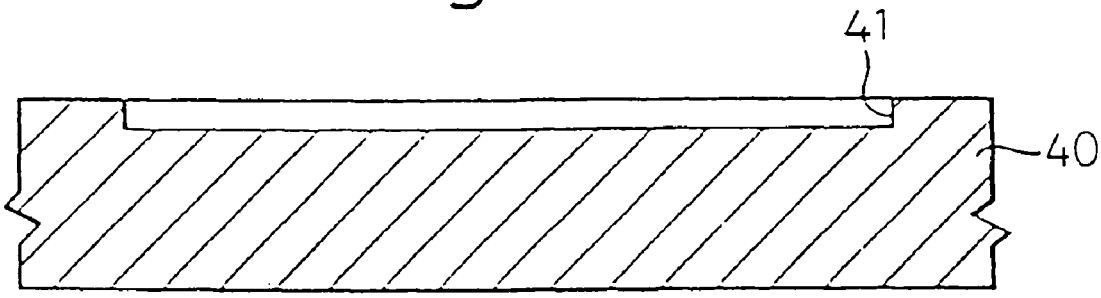
Figure 13:
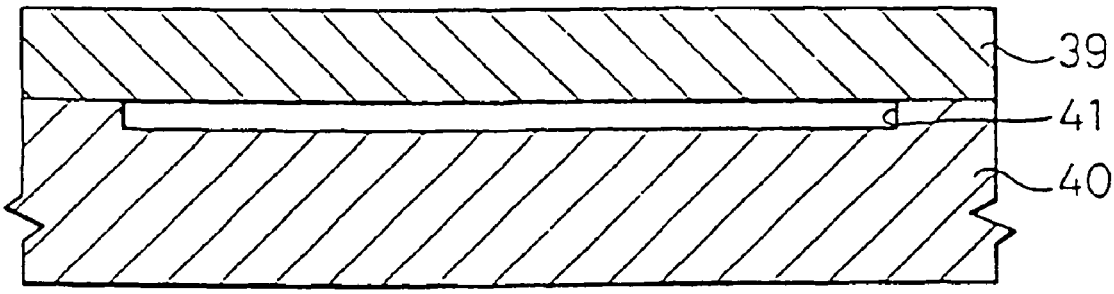

The production method of the sensor shown in FIGS. 9 and 10 will be explained with reference to FIGS. 11, 12 and 13. First of all, a single crystal silicon substrate 39 is prepared as shown in FIG. 11 and another single crystal silicon substrate 40 shown in FIG. 12 is prepared. Further, a recess portion 41 is formed in a predetermined region of a main plane of this single crystal silicon substrate 40. Then, the main plane of the single crystal silicon substrate 40 is directly bonded to the single crystal silicon substrate 39 as shown in FIG. 13. Next, openings having a predetermined pattern are formed on the single crystal silicon substrate 39 by dry etching as shown in FIG. 10.

Figure 14:
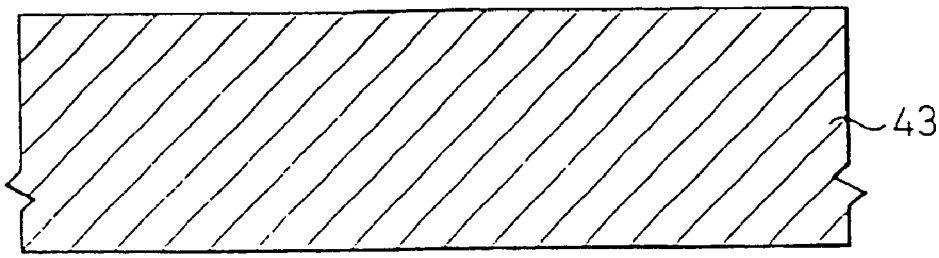
FIGS. 14 to 16 are sectional views, each showing another production step of the angular velocity sensor shown in FIGS. 9 and 10.
Figure 15:
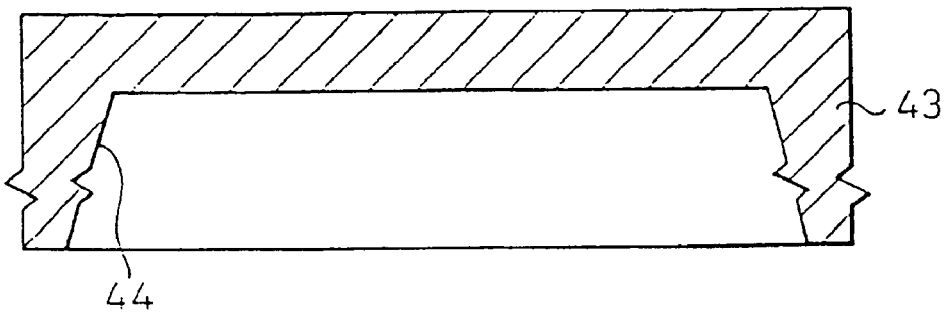
Figure 16:
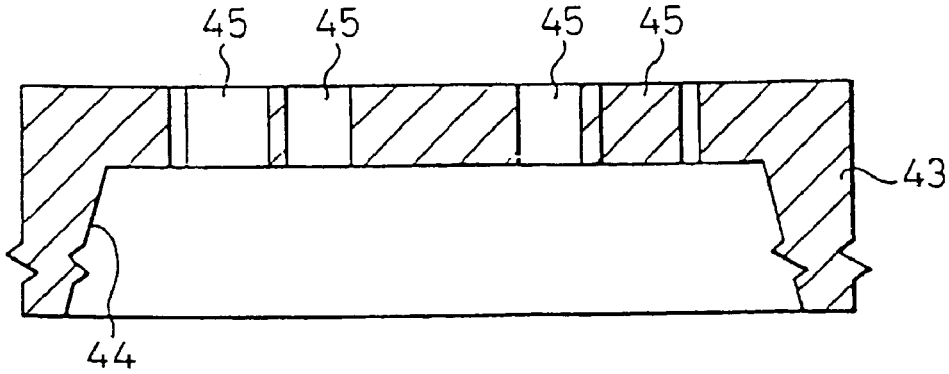

As another application example, the arrangement shown in FIGS. 14, 15 and 16 may be employed as the production method of the sensor shown in FIG. 9. First of all, a single crystal silicon substrate 43 shown in FIG. 14 is prepared, and the back of this single crystal silicon substrate 43 is wet dried to form a recess portion 44 as shown in FIG. 15. Through-holes 45 having a predetermined pattern are then formed in the reduced thickness portion of the single crystal silicon substrate 43 by dry etching as shown in FIG. 16. In this way, the sensor shown in FIG. 9 may be produced.

Besides the angular velocity sensor, a two dimensional acceleration sensor may also be produced. In other words, in FIG. 2, for example, acceleration of the X-axis and acceleration of the Y-axis are measured as the change of the capacitance of the capacitors by the opposed electrodes 11, 15 and by the opposed electrodes 12, 16, respectively.

As described above, the present invention can provide a dynamical quantity sensor having a novel structure.

Hereinafter, another embodiment of the present invention, which embodies the dynamical quantity sensor as an angular velocity sensor will he explained with reference to FIGS. 17 to 24.

Figure 17:
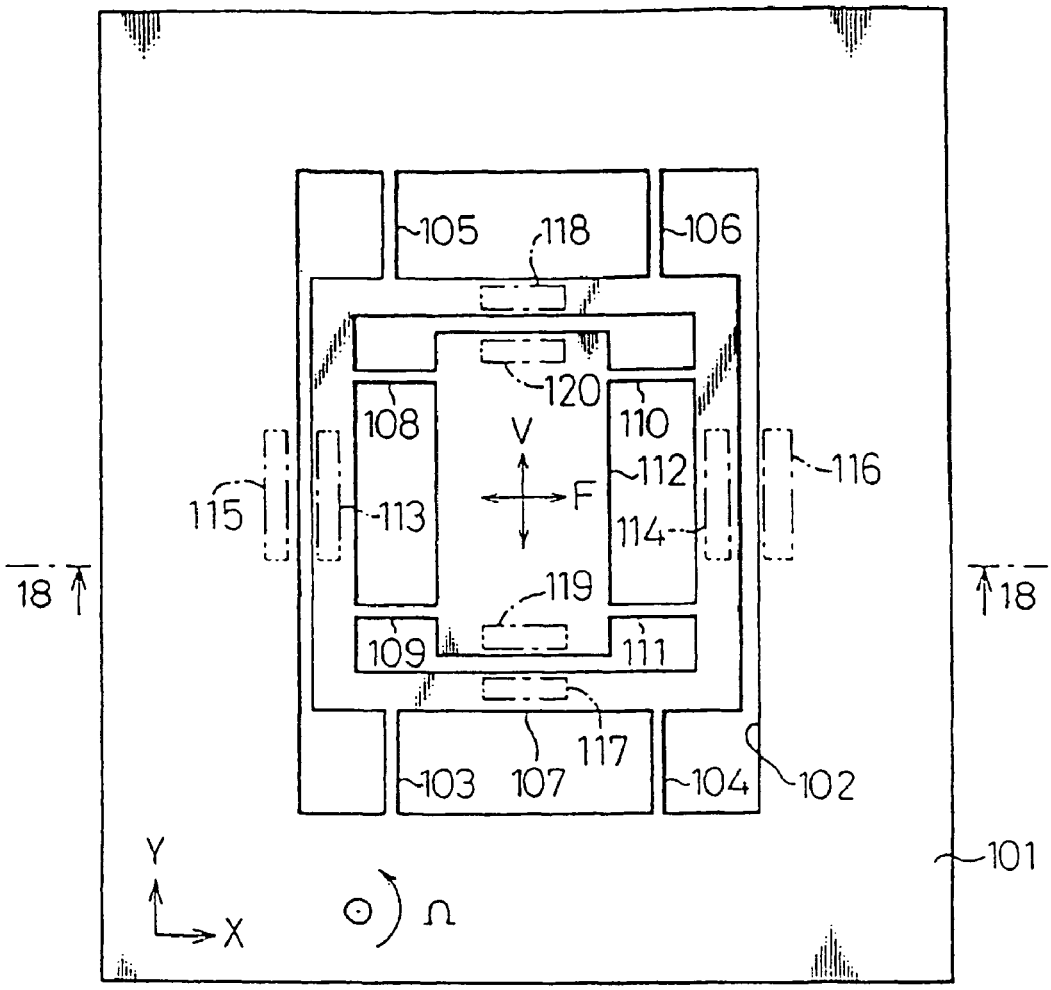
FIG. 17 is a plan view of an angular velocity sensor according to another embodiment of the present invention.
Figure 18:
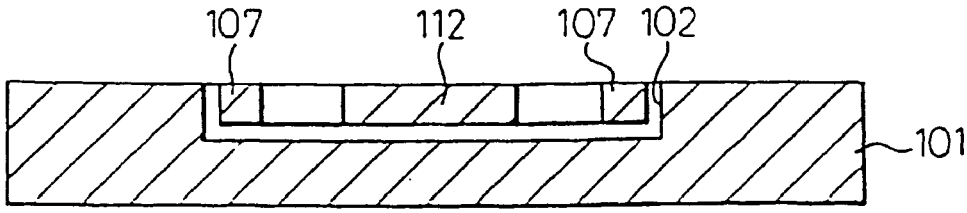
FIG. 18 is a sectional view taken along a line A—A of FIG. 17.

FIG. 17 is a plan view of the angular velocity sensor of this embodiment, and FIG. 18 is a sectional view taken along a line A—A of FIG. 17.

The substrate 101 consists of a single crystal silicon substrate which is several millimeters square and about 200 to 500 μm thick. A rectangular recess portion 102 is formed at the center of this substrate 101. First beams 103 to 106 are so formed on the side walls inside this recess portion 102 as to extend in the vertical direction in FIG. 17 (in the Y-axis direction).

A rectangular frame-like intermediate support member 107 is disposed inside the recess portion 102 and is connected to the other end of each of the first beams 103 to 106. Second beams 108 to 111 are so formed on the inner walls of the rectangular frame-like intermediate support member 107 as to extend in the transverse direction in FIG. 17 (in the X-axis direction). A weight 112 is disposed inside the intermediate support members 107 and is connected to the other end of each of the second beams 108 to 111.

As shown in FIG. 18, predetermined gaps (spaces) are defined between the first beams 103 to 106, the intermediate support members 107, the second beams 108 to 111, the weight 112, and the bottom surface of the recess portion 102.

Incidentally, each of the first and second beams 103 to 106, and 108 to 111 has a width of several millimeters and a thickness of 10 to 50 μm. The intermediate support member 107 has a width of dozens of millimeters, and has a frame-like shape and a thickness of 10 to 50 μm. The weight 112 comprises a rectangular parallelopiped having a dimension of hundreds of millimeters in both transverse and longitudinal directions and a thickness of 10 to 50 μm.

Electrodes 113 and 114 are formed on the right and left side walls on the external surface of the intermediate support member 107 shown in FIG. 17, and electrodes 115 and 116 are formed on the internal walls of the recess portion 102 that opposes the electrodes 113 and 116. Accordingly, the electrodes 113 and 115 constitute opposing electrodes and the electrodes 114 and 116 constitute opposing electrodes.

Electrodes 117 and 118 are formed on the upper and lower internal walls of the intermediate support member 107 shown in FIG. 17, and electrodes 119 and 120 are formed on the side walls of the weight 112 opposing the electrodes 117 and 118. Accordingly, the electrodes 117 and 119 constitute opposing electrodes, and the electrodes 118 and 120 constitute opposing electrodes.

The first and second beams 103 to 106 and 108 to 111, the intermediate support member 107 and the weight 112 are formed by a surface micromachining technique of the substrate 101 using sacrifice layer etching, as will be described later.

Next, the production process of the angular velocity sensor will be explained with reference to FIGS. 19, 20 and 21.

Figure 19:
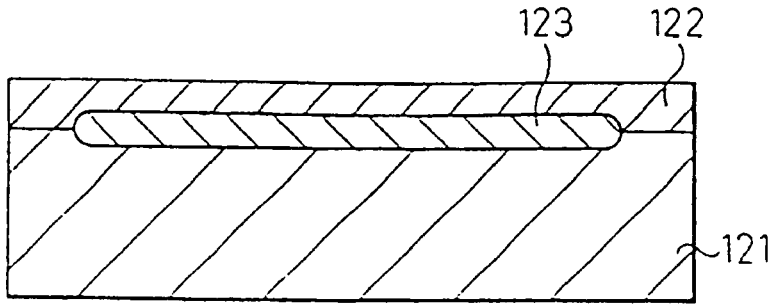
FIGS. 19 to 21 are sectional views, each showing a production step of the angular velocity sensor described above.
Figure 22:
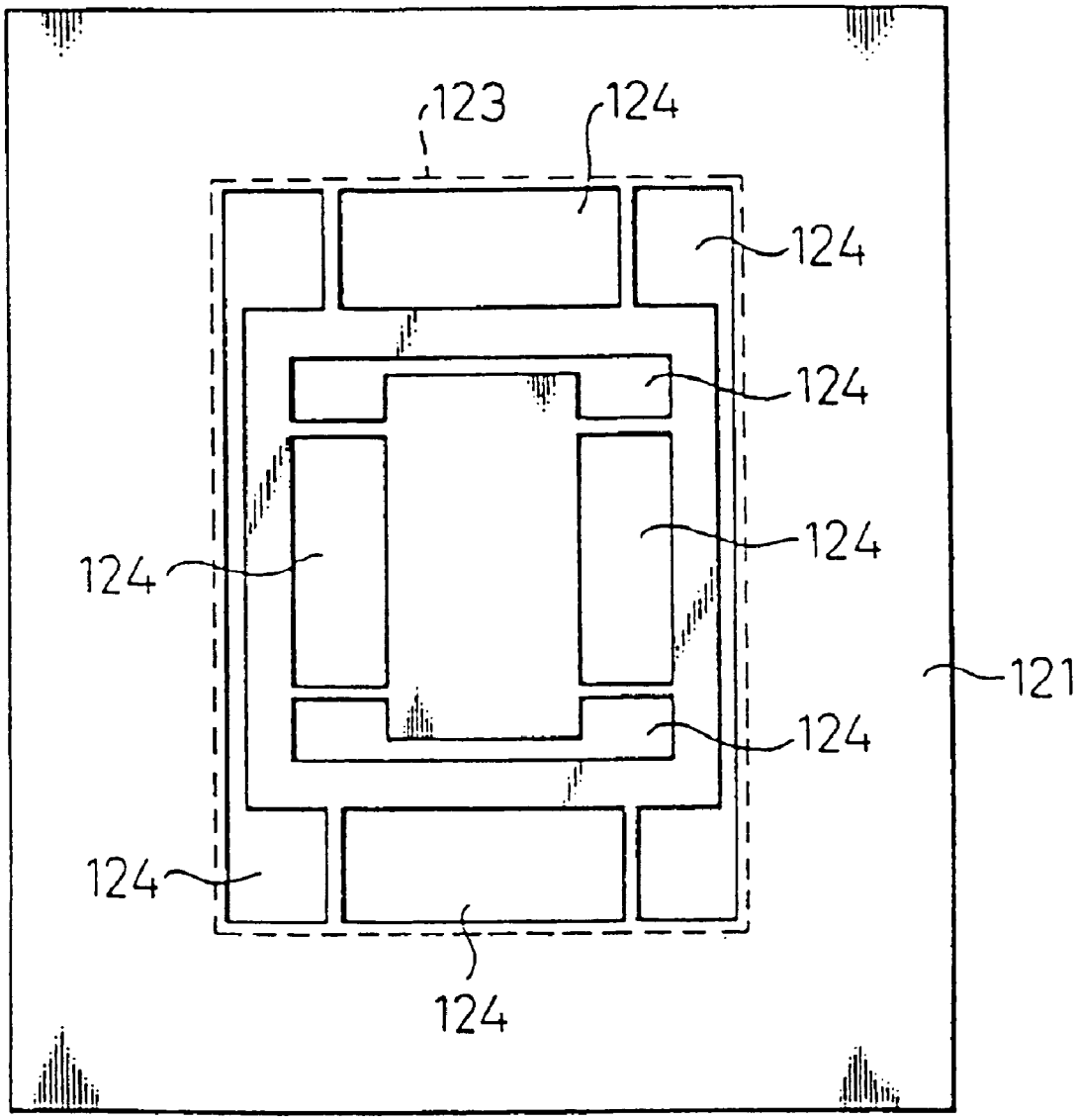
FIG. 22 is a plan view showing a production step of the angular velocity sensor described above.

First of all, a single crystal silicon substrate 121 is prepared as shown in FIG. 19, and a p-type diffusion layer having a thickness of some microns to 10 μm is formed on the surface of this substrate 121. Then, an n-type epitaxial layer 122 is grown to a thickness of 10 to 50 μm on the single crystal silicon layer 122. At this time, a p-type buried layer 123 is formed. FIG. 22 shows the formation region of this p-type buried layer 123.

In the embodiment described above, the opposed electrodes are not disposed at the portions where the peripheral members oppose the weight 112, but the electrodes are disposed on at least a part of each opposed surface of the weight 112 and the intermediate support member 107. Further, the rest of the electrode pairs are disposed on at least a part of each of the opposed surfaces between the inner walls of the recess portion 102 corresponding to the peripheral member 100 and the intermediate support member 107.

Figure 20:
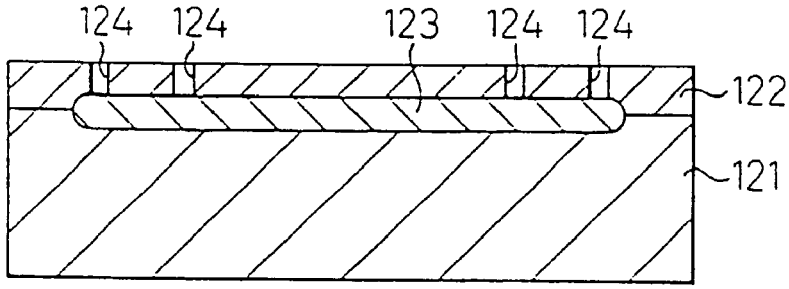
Figure 21:
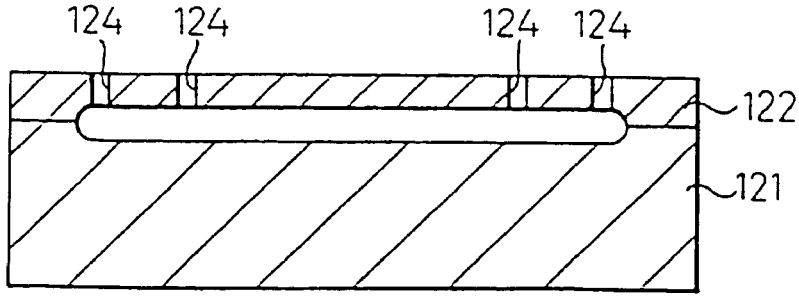

As shown in FIG. 20, trenches 124 having a pattern shown in FIG. 22 are formed by RIE (Reactive Ion Etching) in the n-type epitaxial layer 123. Further, the p-type buried layer 123 is selectively removed by electrochemical etching (sacrifice layer etching) as shown in FIG. 21.

The angular velocity sensor thus produced operates in the following way.

First, an A.C. voltage is applied to the opposed electrodes 117, 119 and 118, 120 shown in FIG. 17 so as to vibrate (excite) the weight 112 in the vertical direction (in the Y-axis direction) in FIG. 17 by electrostatic force. In other words, displacement in the Y-axis direction becomes possible due to the deflection of the second beams 108 to 111.

When the rotary angular velocity (yaw rate: Ω) acts on the axis orthogonally crossing the drawing of FIG. 17, the Coriolis force develops in the direction perpendicular to the original vibration (Y axis), that is, in the transverse direction in FIG. 17 (X axis). At this time, when the mass of the weight 112 is m, the yaw rate round the axis orthogonally crossing the drawing in FIG. 17 is Ω and the velocity of the weight 112 due to the excitation is v, the Coriolis force of $F=2\ mv\Omega$ acts on the weight 112 in the X-axis direction.

Though the weight 112 cannot undergo displacement in the X-axis direction with respect to the intermediate support to member 107, the Coriolis force is transmitted to the intermediate support member 107 through the second beams 108 to 111. The intermediate support member 107 can undergo displacement in the X-axis direction due to the deflection of the first beams 103 to 106. This displacement quantity of the intermediate support member 107 is substantially proportional to the Coriolis force. The displacement of the weight 112 due to this Coriolis force is detected as the capacitance change by the opposed electrodes 113, 115 and the opposed electrodes 114, 116. The rotary angular velocity (yaw rate: Ω) is detected on the basis of this capacitance change.

Another method of measuring the displacement quantity of the weight 112 comprises conducting servo control so that the capacitance change of capacitors (the opposed electrodes 113, 115 and the opposed electrodes 114, 116) becomes zero or in other words, controlling the voltage to be applied to the capacitors so that the displacement of the intermediate support member 107 becomes zero, and determining the Coriolis force from the impressed voltage.

As described above, the present invention employs the construction wherein the first beams 103 to 106 are so disposed as to extend from the substrate 101 (fixed portion), the movable intermediate support member 107 is disposed on these first beams 103 to 106, the second beams 108 to 111 are so disposed on this intermediate support member 107 as to extend in the direction substantially orthogonally crossing the first beams 103 to 106, the weight 112 is disposed on these second beams 108 to 111, the opposing electrodes 117, 119 and the opposing electrodes 118, 120 are used as the electrodes for excitation (capacitors for excitation), and the opposing electrodes 113, 115 and the opposing electrodes 114, 116 are used as the electrodes for detecting the angular velocity (capacitors for detection) so as to detect the movement of the weight with the application of the angular velocity. Since this embodiment uses the beam structure having the weight 112 capable of undergoing two-dimensional displacement under the planar state where micro-machining is possible, this embodiment provides an angular velocity sensor having a novel structure.

Figure 23:
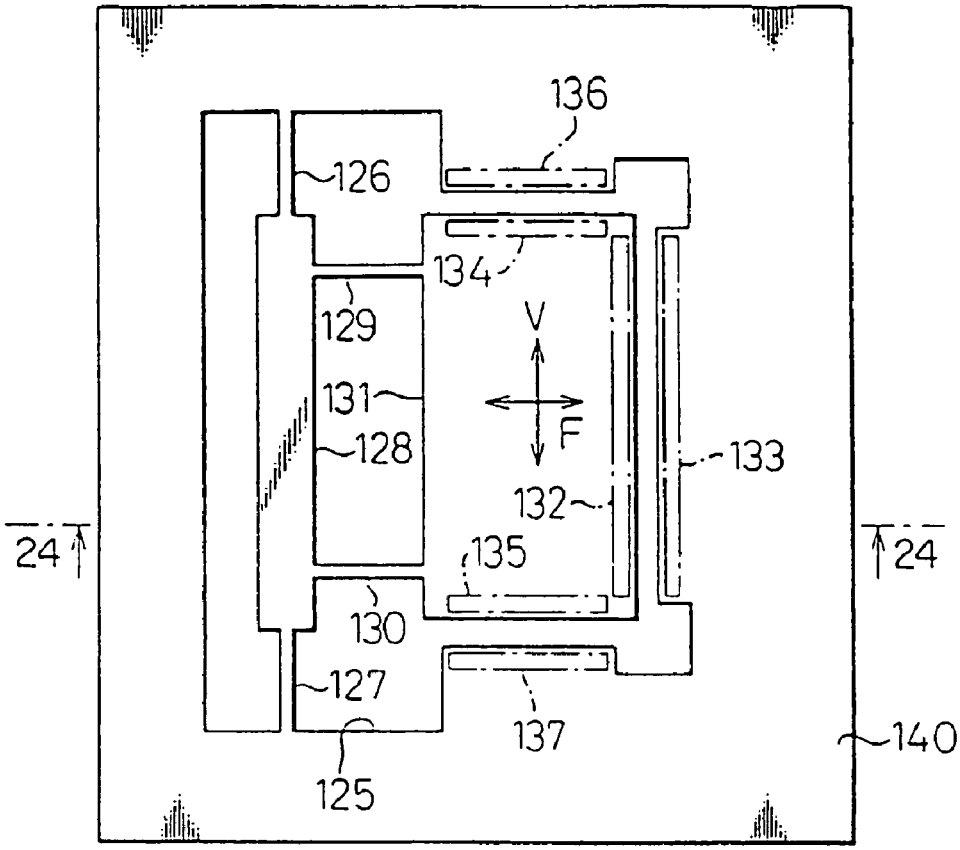
FIG. 23 is a plan view of the angular velocity sensor according to still another embodiment of the present invention.
Figure 24:
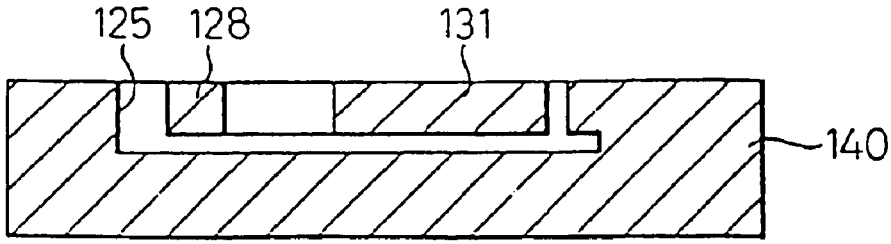
FIG. 24 is a sectional view taken along a line B—B of FIG. 23.

Incidentally, the present invention is not particularly limited to the embodiment described above. For example, though the weight 112 is of the center beam type in the embodiment described above, it may also be of a cantilever beam type as shown in FIGS. 23 and 24. In other words, the first beams 126 and 127 are extended on the side walls inside the recess portion 125 of the substrate 140, the intermediate support member 128 is disposed on the first beams 126, 127, the second beams 129 and 130 as the cantilever beams are extended from this intermediate support member 128, and the weight 131 is disposed on the second beams 129 and 130. The electrode 132 is formed on the side wall of the weight 131 and another electrode 133 is formed on the inner wall of the recess portion 125 opposing the former. Furthermore, the electrodes 134 and 135 are formed on the side walls of the weight 131, and the electrodes 136 and 137 are formed on the inner walls of the recess portion 125 opposing the former.

Though the intermediate support member has the frame-like shape in the foregoing embodiments, it is not particularly limited to the frame-like shape. In other words, it may have a rectangular shape as shown in FIG. 23, for example.

Besides the angular velocity sensor, the present invention may also be applied to a two-dimensional acceleration sensor. In other words, in FIG. 17, acceleration of the X axis is measured as the change of the capacitance of the capacitor by the opposed electrodes 113, 115 and 114, 116 while acceleration of the Y axis is measured as the capacitance change of the capacitor by the opposing electrodes 117, 119 and 118, 120.

As described above in detail, the present invention provides a dynamical quantity sensor having a novel structure.

What is claimed is:

1. A dynamic quantity sensor comprising:

[fist] *a first* electrode formed by selectively etching a semiconductor substrate so as to penetrate in the direction of thickness of the substrate, and being movable in a direction parallel to a surface of the semiconductor substrate in accordance with the action of a dynamical quantity;

a second electrode formed by selectively etching the semiconductor substrate so as to penetrate in the direction of thickness of the substrate, and being movable in a direction parallel to a surface of the semiconductor substrate and perpendicular to the first electrode in accordance with the action of the dynamical quantity; and a third electrode formed at a position opposite to the first and second electrodes by selectively etching the semiconductor substrate so as to penetrate in the direction of thickness of the substrate, and detecting the movement of at least one of the first and second electrodes.

2. A dynamical quantity sensor as claimed in claim 1, further comprising a first substrate formed under the semiconductor substrate.

3. A dynamical quantity sensor as claimed in claim 2, wherein the first substrate comprises an area eliminated by an etching.

4. A dynamical quantity sensor comprising:

a fixed portion consisting of a semiconductor [layers] *layer*;

a first electrode formed on the fixed portion;

a first movable plate supported at the fixed portion by a plurality of beam portions elongated from the fixed portion, and being movable in a direction horizontal to a surface of the fixed portion; and a second electrode formed on a position opposite to the first electrode in the first movable plate;

wherein the first movable plate comprises:

a plurality of coupling points to couple the plurality of beam portions elongated from the fixed portion;

a first weight disposed in an inner area surrounded by the plurality of coupling points; and a second weight fixed to the first weight and an outer area of the plurality of coupling points; and wherein the change of the capacitance between the first and second electrodes is detected so that a dynamical quantity acting on the first movable plate is detected.

5. A dynamical quantity sensor as claimed in claim 4, wherein the first electrode is formed on the second weight.

6. A dynamical quantity sensor as claimed in claim 4, wherein the first movable plate has a frame-like shape.

7. A dynamical quantity sensor as claimed in claim 4, wherein the second weight is fixed by two coupling points in a cantilever-type beam from the first weight.

8. A dynamical quantity sensor as claimed in claim 4, further comprising:

a third electrode formed at a position different from the second electrode in the first movable plate;

a second movable plate supported at the first movable plate by a plurality of beam portions elongated from the first movable plate and being movable in a direction horizontal to the surface of the fixed portion and perpendicular to the first movable plate; and a fourth electrode formed on a position opposite to the third electrode in the second movable plate.

9. A dynamical quantity sensor as claimed in claim 8, wherein an AC voltage is supplied between the third and fourth electrodes, and the second movable plate is excited by an electrostatic force.

10. A dynamical quantity sensor as claimed in claim 8, wherein a dynamical quantity acting on the second movable plate is detected by detecting the change of the capacitance between the third and fourth electrodes.

11. A dynamical quantity sensor as claimed in claim 8, wherein the second movable plate comprises:

a plurality of coupling points coupled to a plurality of beam portions elongated from the first movable plate;

a third weight disposed within the plurality of coupling points; and a fourth weight fixed in a cantilever-type beam from the third weight, and disposed outside of the plurality of coupling points, wherein the fourth electrode is formed on the fourth weight.

12. A dynamical quantity sensor as claimed in claim 11, wherein the fourth weight is fixed by two coupling points in the cantilever-type beam from the third weight.

13. A dynamical quantity sensor comprising:

a semiconductor substrate;

a first electrode being movable in a direction parallel to a surface of the substrate in accordance with the action of a dynamical quantity;

a second electrode being movable in the direction parallel to the surface of the substrate and perpendicular to the first electrode in accordance with the action of the dynamical quantity; and a third electrode formed on a position opposite to the first and second electrodes, and detecting the movement of at least one of the first and second electrodes;

wherein the first, second and third electrodes are formed by selectively etching the substrate so as to penetrate in a direction of thickness of the substrate.

14. A dynamical quantity sensor as claimed in claim 13, further comprising a first substrate formed under the semiconductor substrate.

15. A dynamical quantity sensor as claimed in claim 14, wherein the first substrate comprises an area eliminated by an etching.

16. A dynamical quantity sensor comprising:

a fixed portion consisting of a semiconductor layer;

a first electrode formed on the fixed portion;

a first movable plate supported at the fixed portion by a plurality of *first* beam portions elongated from the fixed portion, and being movable in [a] *an X-axis* direction horizontal to a surface of the fixed portion, *the first beam portions being deflectable in the X-axis direction*; [and]

a second electrode formed on a position opposite to the first electrode in the first movable plate; *and*

*a second movable plate connected to the first movable plate via a plurality of second beam portions elongated from the first movable plate, and being movable in a Y-axis direction perpendicular to the X-axis direction and horizontal to the surface of the fixed portion,*

*wherein the second movable plate is oscillated in the Y-axis direction by using an electrostatic force, and Coriolis force acting on the second movable plate is transmitted to the first movable plate via the second beam portions, and* wherein the change of capacitance between the first and second electrodes *along the X-axis direction* is detected so that a dynamical quantity acting on the first movable plate *which corresponds to the Coriolis force acting on the second movable plate* is detected.

17. A dynamical quantity sensor *as* claimed in claim 16, wherein the first electrode is formed on one of two weights.

18. A dynamical quantity sensor [as claimed in claim 16] *comprising:*

*a fixed portion consisting of a semiconductor layer;*

*a first electrode formed on the fixed portion;*

*a first movable plate supported at the fixed portion by a plurality of beam portions elongated from the fixed portion, and being movable in a direction horizontal to a surface of the fixed portion; and*

*a second electrode formed on a position opposite to the first electrode in the first movable plate,*

*wherein the change of capacitance between the first and second electrodes is detected so that a dynamical quantity acting on the first movable plate is detected, and* wherein the first movable plate has a *rectangular* frame-like shape.

19. A dynamical quantity sensor as claimed in claim 17, wherein the weight onto which the first electrode is formed is fixed by two coupling points in a cantilever-type beam from the other of the said two weights.

20. A dynamical quantity sensor as claimed in claim 16, further comprising:

a third electrode formed at a position different from the second electrode in the first movable plate; *and*

[a second movable plate supported at the first movable plate by a plurality of beam portions elongated from the first movable plate, and being movable in a direction horizontal to the surface of the fixed portion and perpendicular to the first movable plate; and]

a fourth electrode formed on a position opposite to the third electrode in the second movable plate.

21. A dynamical quantity sensor as claimed in claim 20, wherein an AC voltage is supplied between the third and fourth electrodes, and the second movable plate is excited by an electrostatic force.

22. A dynamical quantity sensor as claimed in claim 20, wherein a dynamical quantity acting on the second movable plate is detected by detecting the change of capacitance between the third and fourth electrodes.

23. A dynamical quantity sensor as claimed in claim 20, wherein the second movable plate comprises:

a plurality of coupling points coupled to a plurality of beam portions elongated from the first movable plate;

a third weight disposed within the plurality of coupling points; and a fourth weight fixed in a cantilever-type beam from the third weight, and disposed outside of the plurality of coupling points, wherein the fourth electrode is formed on the fourth weight.

24. A dynamical quantity sensor as claimed in claim 23, wherein the fourth weight is fixed by two coupling points in the cantilever-type beam from the third weight.

25. A dynamical quantity sensor comprising:

a semiconductor substrate;

a first electrode being movable in a direction parallel to a surface of the *semiconductor* substrate in accordance with the action of a dynamical quantity; [and]

a second electrode formed on a position opposite to the first electrode, and detecting the movement of the first electrode;

*a first movable plate in which the first electrode is provided and is movable in an X-axis direction horizontal to a surface of the semiconductor substrate;*

*a second movable plate connected to the first movable plate via a plurality of beams, and being movable in a Y-axis direction perpendicular to the X-axis direction and horizontal to the surface of the semiconductor substrate; and*

*a drive mechanism, including a capacitor, oscillating the second movable plate in the Y-axis direction by using an electrostatic force provided by the capacitor,*

[when] *wherein* the first and second electrodes are formed by selectively etching the semiconductor substrate so as to penetrate in the direction of thickness of the *semiconductor* substrate,

*wherein Coriolis force acting on the second movable plate is detected by using changes in capacitance between the first and second electrodes.*

26. A dynamical quantity sensor as claimed in claim 25, further comprising a first substrate formed under the semiconductor substrate.

27. A dynamical quantity sensor as claimed in claim 26, wherein the first substrate comprises an area eliminated by an etching.

28. A dynamic quantity sensor comprising:

a semiconductor substrate;

a first electrode being movable in a direction parallel to a surface of the semiconductor substrate in accordance with the action of a dynamical quantity; and a second electrode being movable in a direction parallel to a surface of the semiconductor substrate and perpendicular to the first electrode in accordance with the action of the dynamical quantity; and a third electrode formed at a position opposite to the first and second electrodes, and detecting the movement of at least one of the first and second electrodes.

29. A dynamic quantity sensor comprising:

a semiconductor substrate;

a first electrode being movable in a direction parallel to a surface of the semiconductor substrate in accordance with the action of a dynamical quantity; [and]

a second electrode formed at a position opposite to the first *electrode*, and detecting the movement of the first electrode*;*

*a first movable plate in which the first electrode is provided and is movable in an X-axis direction horizontal to a surface of the semiconductor substrate;*

*a second movable plate connected to the first movable plate via a plurality of beams, and being movable in a Y-axis direction perpendicular to the X-axis direction and horizontal to the surface of the semiconductor substrate; and*

*a drive mechanism, including a capacitor, oscillating the second movable plate in the Y-axis direction by using an electrostatic force provided by the capacitor,*

*wherein Coriolis force acting on the second movable plate along the X-axis direction is transmitted to the first movable plate via the beams and a movement of the first movable plate is detected by using change in capacitance between the first and second electrodes.*

30. A dynamical quantity sensor comprising:

a first electrode formed by selectively etching a semiconductor substrate so as to penetrate in a direction of thickness of the substrate, and being movable in the direction parallel to a surface of the semiconductor substrate in accordance with the action of a dynamical quantity; and a second electrode formed at a position opposite to the first electrode by selectively etching the semiconductor substrate so as to penetrate in the direction of thickness of the substrate; and a surrounding portion surrounding the first electrode and second electrode, wherein a part of the surrounding portion is more thick than the first electrode and second electrode.

* * * * *